US012645952B2

(12) United States Patent
Speiser et al.

(10) Patent No.: US 12,645,952 B2
(45) Date of Patent: Jun. 2, 2026

(54) VISUAL QUESTION ANSWERING WITH KNOWLEDGE GRAPHS

(71) Applicant: SAP SE, Walldorf (DE)

(72) Inventors: Artur Speiser, Munich (DE); Moin Nabi, Berlin (DE); Tassilo Klein, Berlin (DE)

(73) Assignee: SAP SE, Walldorf (DE)

( * ) Notice: Subject to any disclaimer, the term of this patent is extended or adjusted under 35 U.S.C. 154(b) by 1052 days.

(21) Appl. No.: 17/362,607

(22) Filed: Jun. 29, 2021

(65) Prior Publication Data

US 2022/0414482 A1    Dec. 29, 2022

(51) Int. Cl.
| | |
|---|---|
| *G06N 5/022* | (2023.01) |
| *G06F 16/9032* | (2019.01) |
| *G06N 3/045* | (2023.01) |
| *G06N 20/00* | (2019.01) |

(52) U.S. Cl.
CPC ....... *G06N 5/022* (2013.01); *G06F 16/90332* (2019.01); *G06N 3/045* (2023.01); *G06N 20/00* (2019.01)

(58) Field of Classification Search
CPC ........ G06N 5/022; G06N 3/045; G06N 20/00; G06N 3/044; G06N 3/0464; G06N 3/08; G06F 16/90332; G06F 16/9024
See application file for complete search history.

(56) References Cited

U.S. PATENT DOCUMENTS

| | | | | |
|---|---|---|---|---|
| 11,599,749 | B1 * | 3/2023 | Ziaeefard | ................. G06N 3/08 |
| 2017/0364766 | A1 * | 12/2017 | Das | ........................ G06V 20/20 |

| | | | | |
|---|---|---|---|---|
| 2018/0068031 | A1 * | 3/2018 | Hewavitharana | ... G06F 9/30156 |
| 2019/0045207 | A1 * | 2/2019 | Chen | ....................... G06N 3/045 |
| 2020/0065612 | A1 * | 2/2020 | Xu | ........................ G06V 40/174 |
| 2020/0222010 | A1 * | 7/2020 | Howard | ................... G06N 5/02 |
| 2021/0134387 | A1 * | 5/2021 | McMaster-Schraiber | ................... |
| | | | | G06N 3/045 |
| 2021/0306173 | A1 * | 9/2021 | Krikunov | ................ G06F 3/015 |
| 2021/0350357 | A1 * | 11/2021 | Lafontaine | ........... G06Q 20/401 |

(Continued)

OTHER PUBLICATIONS

Using Convolutional Neural Networks for Image Recognition— Edge AI and Vision Alliance (Year: 2015) "edge ai +vidsion alliance".*

(Continued)

*Primary Examiner* — Kevin W Figueroa
(74) *Attorney, Agent, or Firm* — Mintz Levin Cohn Ferris Glovsky and Popeo, P.C.

(57) ABSTRACT

Aspects of the current subject matter are directed to a system in which knowledge graphs are incorporated with visual question answering. A knowledge graph is integrated into a visual question answering system to provide additional knowledge from one or more sources to answer a question about an image. Aspects of the current subject matter are directed to a neural network approach that combines methods of image feature extraction and questions processing with a neural network, such as a graph neural network, that operates on knowledge graphs. The graph neural network takes input vector representations of the nodes as inputs and combines them according to their relationships into question-specific representations. The question-specific representations are then processed with the image features and the question features to generate an answer.

11 Claims, 4 Drawing Sheets

(56)                References Cited

U.S. PATENT DOCUMENTS

2021/0357702 A1*  11/2021  Jaw ........................ G06V 30/41
2022/0318553 A1*  10/2022  Ben Yahia ............... G06N 3/08

OTHER PUBLICATIONS

Knowledge graph for identifying hazards on construction sites_ Integrating computer vision with ontology (Year: 2020) "Weili Fang".*

Ramnath, Kiran, and Mark Hasegawa-Johnson. "Seeing is knowing! fact-based visual question answering using knowledge graph embeddings." arXiv preprint arXiv:2012.15484 (2020). (Year: 2020).*

Alberts, H. et al., "Visualsem: a high-quality knowledge graph for vision and language." *arXiv preprint arXiv:2008.09150*, 2020.

Anderson, P. et al., "Bottom-up and top-down attention for image captioning and visual question answering." In *CVPR*, 2018.

Antol, S. et al., "Vqa: Visual question answering." In *Proceedings of the IEEE international conference on computer vision*, pp. 2425-2433, 2015.

Ben-Younes, H. et al., "Mutan: Multimodal tucker fusion for visual question answering." In *Proceedings of the IEEE international conference on computer vision*, pp. 2612-2620, 2017.

Johnson, J. et al., "Densecap: Fully convolutional localization networks for dense captioning." In *Proceedings of the IEEE conference on computer vision and pattern recognition*, pp. 4565-4574, 2016.

Kim, J.-H. et al., "Bilinear attention networks." In *Advances in Neural Information Processing Systems*, pp. 1564-1574, 2018.

Kipf, T. N. et al., "Semi-supervised classification with graph convolutional works." *arXiv preprint arXiv:1609.02907*, 2016.

Lin, T.-Y. et al., "Microsoft coco: Common objects in context." In *European conference on computer vision*, pp. 740-755. Springer, 2014.

Marino, K. et al., "Ok-vqa: A visual question answering benchmark requiring external knowledge." In *Proceedings of the IEEE Conference on Computer Vision and Pattern Recognition*, pp. 3195-3204, 2019.

Narasimhan, M. et al., "Out of the box: Reasoning with graph convolution nets for factual visual question answering." In *Advances in neural information processing systems*, pp. 2654-2665, 2018.

Pennington, J. et al., "Glove: Global vectors for word representation." In *Proceedings of the 2014 conference on empirical methods in natural language processing (EMNLP)*, pp. 1532-1543, 2014.

Reimers, N. et al., Sentence-bert: Sentence embeddings using siamese bert-networks. In *Proceedings of the 2019 Conference on Empirical Methods in Natural Language Processing*. Association for Computational Linguistics, Nov. 2019.

Singh, A. et al., "Towards vqa models that can read." In *Proceedings of the IEEE Conference on Computer Vision and Pattern Recognition*, pp. 8317-8326, 2019.

Yu, J. et al., "Cross-modal knowledge reasoning for knowledge-based visual question answering." *Pattern Recognition*, 108:107563, 2020.

Zhang, Y. et al., "Learning to count objects in natural images for visual question answering." *arXiv preprint arXiv:1802.05766*, 2018.

* cited by examiner

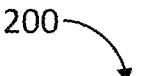
200
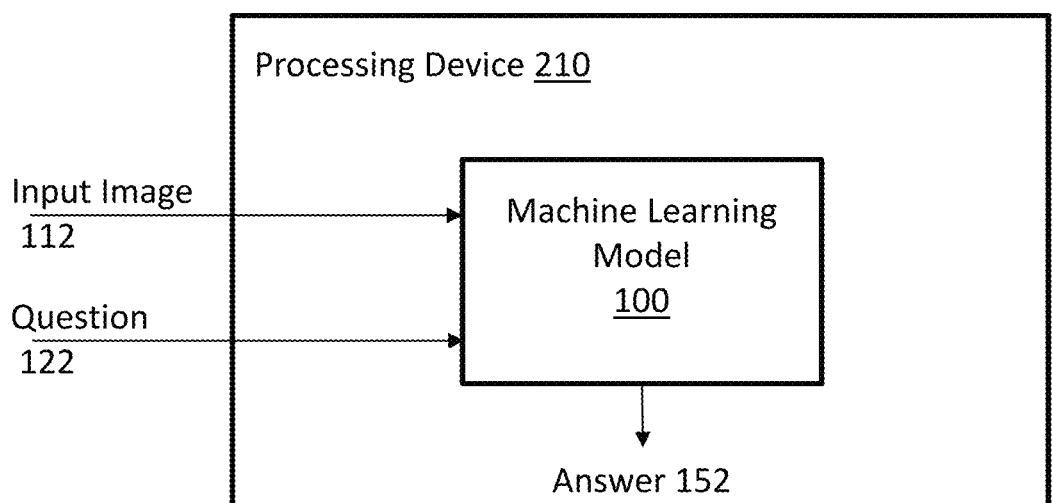
FIG. 2

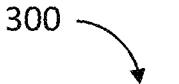

300

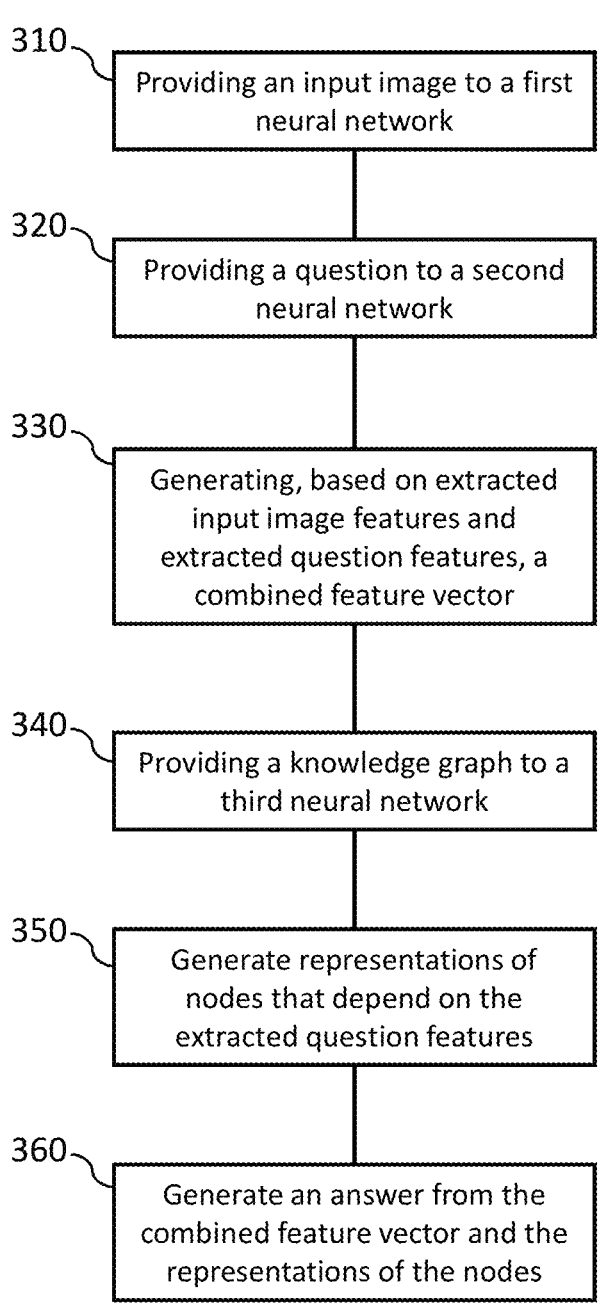

310 — Providing an input image to a first neural network

320 — Providing a question to a second neural network

330 — Generating, based on extracted input image features and extracted question features, a combined feature vector 340 — Providing a knowledge graph to a third neural network 350 — Generate representations of nodes that depend on the extracted question features 360 — Generate an answer from the combined feature vector and the representations of the nodes

VISUAL QUESTION ANSWERING WITH KNOWLEDGE GRAPHS

BACKGROUND

Machine learning models can be used by computer processors to automatically learn (e.g., progressively improve performance on a specific task) from data. Visual question answering is a machine learning task of answering questions about an image. Knowledge graphs organize knowledge or data into a graph structure that includes nodes and vertices.

SUMMARY

Methods, systems, and articles of manufacture, including computer program products, are provided for a system in which knowledge graphs are integrated with visual question answering.

According to an aspect of the current subject matter, a system includes a first neural network configured to receive an input image and extract features from the input image; a second neural network configured to receive a question and extract features from the question; a fusion engine configured to generate, based on the extracted input image features and the extracted question features, a combined feature vector; a third neural network configured to receive a knowledge graph, the knowledge graph including nodes and vertices connecting the nodes, and generate representations of the nodes that depend on the extracted question features; and a classification engine configured to generate, based on the combined feature vector and the representations of the nodes, an answer to the question.

According to an inter-related aspect, a method includes receiving, at a first neural network, an input image, the first neural network configured to extract features from the input image; receiving, at a second neural network, a question, the second neural network configured to extract features from the question; generating, based on the extracted input image features and the extracted question features, a combined feature vector; receiving, at a third neural network, a knowledge graph, the knowledge graph including nodes and vertices connecting the nodes, the third neural network configured to generate representations of the nodes that depend on the extracted question features; and generating, based on the combined feature vector and the representations of the nodes, an answer to the question.

According to an inter-related aspect, a non-transitory computer readable medium is provided, the non-transitory computer readable medium storing instructions, which when executed by at least one data processor, result in operations including receiving, at a first neural network, an input image, the first neural network configured to extract features from the input image; receiving, at a second neural network, a question, the second neural network configured to extract features from the question; generating, based on the extracted input image features and the extracted question features, a combined feature vector; receiving, at a third neural network, a knowledge graph, the knowledge graph including nodes and vertices connecting the nodes, the third neural network configured to generate representations of the nodes that depend on the extracted question features; and generating, based on the combined feature vector and the representations of the nodes, an answer to the question.

In some variations, one or more of the features disclosed herein including the following features can optionally be included in any feasible combination. The first neural network may be a convolutional neural network. The second neural network may be a recurrent neural network. The combined feature vector may be based on weights assigned to possible combinations of the extracted input image features and the extracted question features. The extracted input image features may correspond to different regions of the input image, where the extracted question features correspond to different words of the question. The third neural network may be a graph neural network. The third neural network may be trained to, based on the extracted input image features and the extracted question features, aggregate information from the nodes of the knowledge graph. Generating the answer to the question may include assigning, for one or more nodes of the knowledge graph, a probability that a given one of the one or more nodes represents the answer to the question. A web-based application may access one or more of the first neural network, the second neural network, the fusion engine, the third neural network, and the classification engine, the web-based application configured to receive the input image and the question. The first neural network, the second neural network, the fusion engine, the third neural network, and the classification engine may include a machine learning model.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 illustrates aspects of an example implementation of a system in which a knowledge graph is integrated with a visual question answering system consistent with implementations of the current subject matter;

FIG. 3 depicts a flowchart illustrating a process consistent with implementations of the current subject matter;

Figure 1:
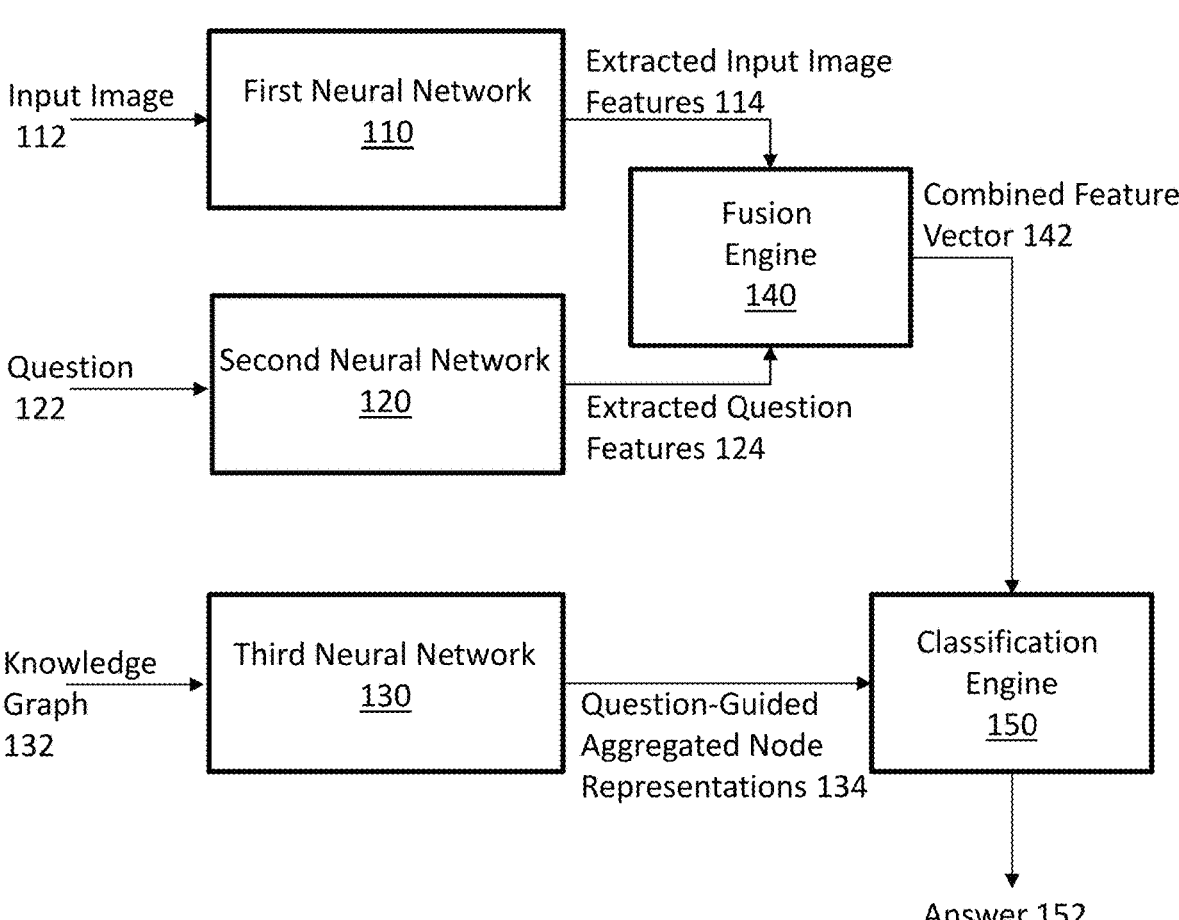
FIG. 1 illustrates aspects of a system integrating a knowledge graph with a visual question answering system consistent with implementations of the current subject matter.

Like labels are used to refer to same or similar items in the drawings.

DETAILED DESCRIPTION

Aspects of the current subject matter are directed to a machine learning model in which knowledge graphs are integrated into a visual question answering system. A visual question answering system is a machine learning model that answers questions about an image. For example, a visual question answering system may generate an answer to a question about a particular object contained in an image or a particular characteristic of an image. Visual question answering is limited to the answer being contained in the image. In particular, the answer needs to be directly obtainable from the image.

A knowledge graph is a graphical approach of organizing knowledge or data from one or more information sources such as databases. A knowledge graph may be constructed with nodes that represent entities and vertices (or edges) that represent relationships between the entities. For example, a knowledge graph may be constructed from a movie database. In such an example, the nodes may represent, for example, movie titles, actors, producers, money generated, and release year. The vertices connect the nodes related to each other.

According to aspects of the current subject matter, a knowledge graph is integrated into a visual question answering system to provide additional knowledge from one or more sources to answer a question about an image. For example, consistent with implementations of the current subject matter, by integrating a knowledge graph with a visual question answering system, the scope of questions that can be answered increases. Available knowledge graphs may contain hundreds of thousands of entities and millions of facts that are connected by various relationships, thereby increasing the type of questions that may be answered by the integrated visual question answering-knowledge graph approach consistent with implementations of the current subject matter.

Aspects of the current subject matter are directed to a neural network approach that combines methods of image feature extraction and questions processing with a neural network, such as a graph neural network, that operates on knowledge graphs. The graph neural network takes input vector representations of the nodes as inputs and combines them according to their relationships into question-specific representations. The question-specific representations are then processed with the image features and the question features to select an answer. According to implementations of the current subject matter, nodes from the knowledge graph are matched to each question based on the language features of the nodes.

FIG. 1 is a block diagram depicting aspects of a machine learning model 100 consistent with implementations of the current subject matter. According to aspects of the current subject matter, the machine learning model 100 includes a first neural network 110, a second neural network 120, and a third neural network 130. The machine learning model 100 also includes a fusion engine 140 and a classification engine 150.

The first neural network 110 receives an input image 112 and is configured to extract features from the input image 112. The first neural network 110 is configured to generate extracted input image features 114. The first neural network 110 may be a convolutional neural network. Consistent with implementations of the current subject matter, the input image feature extraction may be based on a bottom-up attention strategy based on a residual network convolutional neural network.

The second neural network 120 receives a question 122 and is configured to extract features from the question 122. The second neural network 120 is configured to generate extracted question features 124. The second neural network 120 may be a recurrent neural network. Consistent with implementations of the current subject matter, each question 122 is tokenized and limited to a defined length of number of words. For example, each question 122 may be limited in a range of between 5 and 20 words. Each word is represented by a dimensional embedding vector learned during trained.

For example, each word may be represented by a 300 dimensional embedding vector. Other vector sizes may be used. The vector may be passed through a recurrent gated unit in the recurrent neural network.

The extracted input image features 114 and the extracted question features 124 are inputted into the fusion engine 140. The fusion engine 140 is configured to assign weights to possible combinations of image features 114 (corresponding to different regions of the image) and question features 124 (corresponding to different words). Based on the weights of the possible combinations, the fusion engine 140 is configured to combine the features into a single combined feature vector 142. According to aspects of the current subject matter, fusion refers to the transformation of the outputs of the image feature extraction and the question feature extraction into a single, combined feature vector 142 that is fed to the classification engine 150. According to aspects of the current subject matter, various fusion algorithms may be implemented and used. Consistent with implementations of the current subject matter, an attention weight is calculated for each image feature. This may be done by concatenating the last output of the question recurrent gated unit and the feature vector, and passing it through a non-linear layer. The weighted sum of the features is transformed into the combined feature vector 142.

The third neural network 130 receives a knowledge graph 132. The knowledge graph 132 includes nodes and vertices connecting the nodes. The knowledge graph 132 is constructed with nodes that represent entities and vertices (or edges) that represent relationships between the entities. The third neural network 130 is configured to generate representations of the nodes which depend on the question features. The generated representations are referred to herein as question-guided aggregated node representations 134. The third neural network 130 may be a graph neural network and may be trained to aggregate information from nodes depending on the input image features 114 and the question features 124. Consistent with implementations of the current subject matter, the question-guided aggregated node representation 134 are based off of vector representations of the nodes.

Consistent with implementations of the current subject matter, the classification engine 150 receives the combined feature vector 142 and the question-guided aggregated node representations 134. The classification engine 150 is configured to generate an answer 152 from the combined feature vector 142 and the question-guided aggregated node representations 134. The classification engine 150 assigns to each node (or to a subset of one or more nodes) a probability that the node represents the answer to the question 122. The node with the highest assigned probability is regarded as the answer 152 to the question 122.

According to aspects of the current subject matter, a ground-truth node is assigned to each question. The ground-truth node is the node that the machine learning model 100 is trained to identify as the correct answer to the question. The identification of the ground-truth node is done by matching language features of each node of the knowledge graph with the feature of the ground-truth answer.

For every question, a subset of nodes is selected, the subset of nodes treated as possible answers to the question. By matching the language features of each node with the features of the question, and the features of the image annotations, the subset of nodes may be determined. According to aspects of the current subject matter, the question-guided aggregated node representations are fed or provided to the classification engine 150.

FIG. 2 illustrates aspects of an example implementation 200 in which a knowledge graph is integrated with a visual question answering system consistent with implementations of the current subject matter. A processing device 210 includes the machine learning model 100. The processing device 210 may be a user processing device, a server, or any type of computing device capable of processing operations for one or more applications. The machine learning model 100 may be, for example, deployed on the processing device 210 as a web-based application. As further described herein, the machine learning model 100 includes three neural networks, which may be trained neural networks. The first neural network 110 receives and processes the input image 112, and the second neural network 120 receives and processes the question 122. The machine learning model 100 further includes the third neural network 130, the fusion engine 140, and the classification engine 150, in which the classification engine generates the answer 152.

Consistent with implementations of the current subject matter, the machine learning model 100 is further configured to generate an answer 152 or a representation of the answer 152. The answer 152 is generated by the classification engine 150, by another engine of the machine learning model 100, or by a separate processor (e.g., a separate processor of the processing device 210). The representation of the answer 152 may be a visual representation of the answer 152. The representation may be displayed on a display unit of the processing device 210. In some implementations, the representation is displayed in response to a query that includes the input image 112 and the question 114. For example, in a web-based application approach, the machine learning model 100 may allow for the input and/or selection of the input image 112 and the question 114.

FIG. 3 depicts a flowchart 300 illustrating a process consistent with implementations of the current subject matter. The process depicted by the flowchart 300 may be implemented by the machine learning model 100.

At 310, an input image 112 is provided to a first neural network 110. For example, and with reference to FIG. 1, the first neural network 110 may receive as an input the input image 112. The first neural network 110, consistent with implementations of the current subject matter, is configured to extract features from the input image 112. For example, the first neural network 110 generates extracted input image features 114 from the input image 112.

At 320, a question 122 is provided to a second neural network 120. For example, and with reference to FIG. 1, the second neural network 120 may receive as an input the question 122. The second neural network 120, consistent with implementations of the current subject matter, is configured to extract features from the question 122. For example, the second neural network 120 generates extracted question features 124 from the question 122.

In some implementations, the input image 112 and the question 114 may be provided as a query to a web-based application, for example. For example, and with reference to FIG. 2, a user of a processing device 210 may provide or otherwise select the input image 112 and the question 122, and may initiate a command or request for the processing device 210 to determine an answer (e.g., the answer 152) to the question 122.

At 330, a combined feature vector is generated. For example, and with reference to FIG. 1, a fusion engine 140 is configured to receive the extracted input image features 114 and the extracted question features 124 and is further configured to generate the combined feature vector 142. The combined feature vector 142 is generated based on weights being assigned to possible combinations of image features 114 (corresponding to different regions of the image) and question features 124 (corresponding to different words). Based on the weights of the possible combinations, the fusion engine 140 combines the features into a single combined feature vector 142.

At 340, a knowledge graph 132, including nodes and vertices connecting the nodes, is provided to a third neural network 130. The knowledge graph 132 is constructed with nodes that represent entities and vertices (or edges) that represent relationships between the entities. For example, and with reference to FIG. 1, the third neural network 130 may receive as an input the knowledge graph 132. The third neural network 130, consistent with implementations of the current subject matter, is configured to generate representations of the nodes that depend on the extracted question features.

At 350, representations of the nodes that depend on the extracted question features are generated by the third neural network 130. For example, and with reference to FIG. 1, the third neural network 130 generates question-guided aggregated node representations 134. The third neural network 130 is configured to generate representations of the nodes which depend on the question features (the question-guided aggregated node representations 134). The third neural network 130 may be a graph neural network and may be trained to aggregate information from nodes depending on the input image features 114 and the question features 124. Consistent with implementations of the current subject matter, the question-guided aggregated node representation 134 are based off of vector representations of the nodes.

At 360, an answer 152 is generated from the combined feature vector 142 and the question-guided aggregated node representations 134. For example, and with reference to FIG. 1, the classification engine 150 receives as input the combined feature vector 142 from the fusion engine 140 and the question-guided aggregated node representations 134 from the third neural network 130. The classification engine 150 is configured to assign to one or more nodes a probability that a given one of the one or more nodes represents the answer to the question 122. The node with the highest assigned probability is regarded as the answer 152 to the question 122.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
a first neural network configured to receive an input image and extract features from the input image;
a second neural network configured to receive a question and extract features from the question;
a fusion engine configured to generate, based on the extracted input image features and the extracted question features, a combined feature vector;
a third neural network configured to receive a knowledge graph, the knowledge graph including nodes and vertices connecting the nodes, and generate representations of the nodes that depend on the extracted question features; and
a classification engine configured to generate, based on the combined feature vector and the representations of the nodes, an answer to the question.

Example 2. The system of Example 1, wherein the first neural network comprises a convolutional neural network, wherein the second neural network comprises a recurrent neural network.

Example 3. The system of Example 1 or 2, wherein the combined feature vector is based on weights assigned to possible combinations of the extracted input image features and the extracted question features.

Example 4. The system of any of Examples 1-3, wherein the extracted input image features correspond to different regions of the input image, wherein the extracted question features correspond to different words of the question.

Example 5. The system of any of Examples 1-4, wherein the third neural network comprises a graph neural network.

Example 6. The system of any of Examples 1-5, wherein the third neural network is trained to, based on the extracted input image features and the extracted question features, aggregate information from the nodes of the knowledge graph.

Example 7. The system of any of Examples 1-6, wherein generating the answer to the question comprises assigning, for one or more nodes of the knowledge graph, a probability that a given one of the one or more nodes represents the answer to the question.

Example 8. The system of any of Examples 1-7, wherein a web-based application accesses one or more of the first neural network, the second neural network, the fusion engine, the third neural network, and the classification engine, the web-based application configured to receive the input image and the question.

Example 9. The system of Example 8, wherein the first neural network, the second neural network, the fusion engine, the third neural network, and the classification engine comprise a machine learning model.

Example 10. A method comprising:

receiving, at a first neural network, an input image, the first neural network configured to extract features from the input image;

receiving, at a second neural network, a question, the second neural network configured to extract features from the question;

generating, based on the extracted input image features and the extracted question features, a combined feature vector;

receiving, at a third neural network, a knowledge graph, the knowledge graph including nodes and vertices connecting the nodes, the third neural network configured to generate representations of the nodes that depend on the extracted question features; and generating, based on the combined feature vector and the representations of the nodes, an answer to the question.

Example 11. The method of Example 10, wherein the first neural network comprises a convolutional neural network, wherein the second neural network comprises a recurrent neural network.

Example 12. The method of Example 10 or 11, wherein the combined feature vector is based on weights assigned to possible combinations of the extracted input image features and the extracted question features.

Example 13. The method of any of Examples 10-12, wherein the extracted input image features correspond to different regions of the input image, wherein the extracted question features correspond to different words of the question.

Example 14. The method of any of Examples 10-13, wherein the third neural network comprises a graph neural network.

Example 15. The method of any of Examples 10-14, wherein the third neural network is trained to, based on the extracted input image features and the extracted question features, aggregate information from the nodes of the knowledge graph.

Example 16. The method of any of Examples 10-15, wherein generating the answer to the question comprises assigning, for one or more nodes of the knowledge graph, a probability that a given one of the one or more nodes represents the answer to the question.

Example 17. The method of any of Examples 10-16, wherein a web-based application accesses the machine learning model, the web-based application configured to receive the input image and the question.

Example 18. A non-transitory computer-readable storage medium including program code, which when executed by at least one data processor, causes operations comprising:

receiving, at a first neural network, an input image, the first neural network configured to extract features from the input image;

receiving, at a second neural network, a question, the second neural network configured to extract features from the question;

generating, based on the extracted input image features and the extracted question features, a combined feature vector;

receiving, at a third neural network, a knowledge graph, the knowledge graph including nodes and vertices connecting the nodes, the third neural network configured to generate representations of the nodes that depend on the extracted question features; and generating, based on the combined feature vector and the representations of the nodes, an answer to the question.

Example 19. The non-transitory computer-readable storage medium of Example 18, wherein the third neural network comprises a graph neural network, wherein the third neural network is trained to, based on the extracted input image features and the extracted question features, aggregate information from the nodes of the knowledge graph.

Example 20. The non-transitory computer-readable storage medium of Example 18 or 19, wherein generating the answer to the question comprises assigning, for each node of the knowledge graph, a probability that a given node represents the answer to the question.

Figure 4:
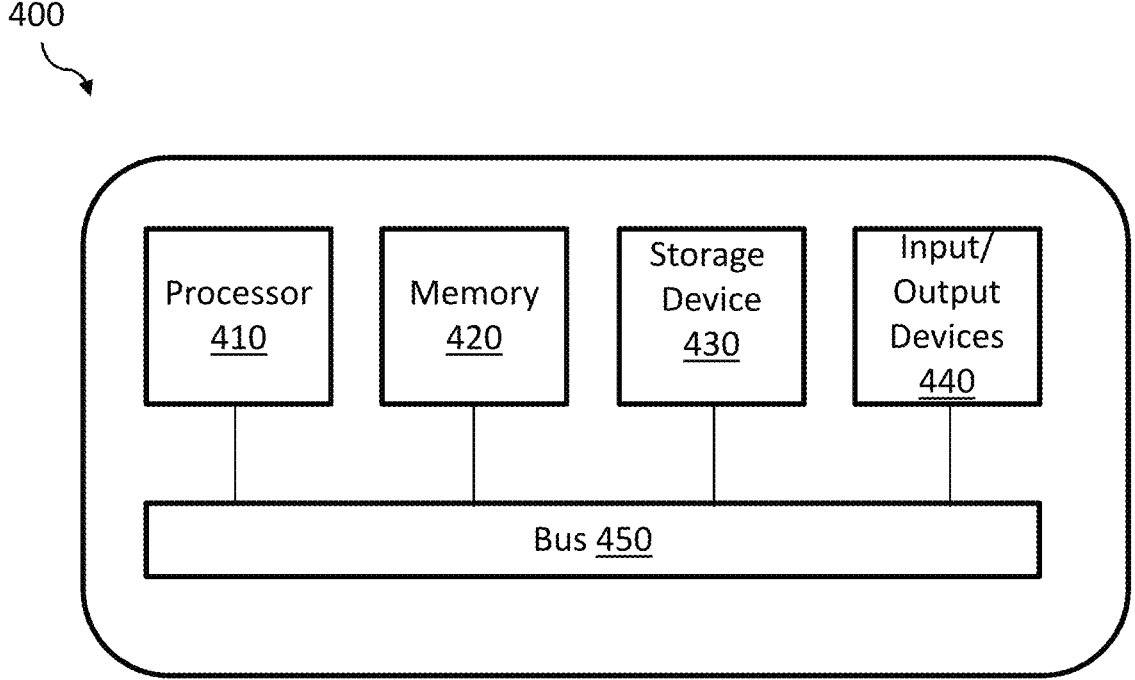
FIG. 4 depicts a block diagram illustrating a computing system consistent with implementations of the current subject matter.

FIG. 4 depicts a block diagram illustrating a computing system 400 consistent with implementations of the current subject matter. In some implementations, the current subject matter may be configured to be implemented in a system 400.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the system 100. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed application-specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
at least one memory; and
at least one processor including instructions which when executed by the at least one processor cause at least:
    a first neural network comprising a convolutional neural network trained to perform image feature extraction using a bottom-up attention strategy, the convolutional neural network configured to receive an input image and extract features from the input image using bottom-up attention strategy;
    a second neural network comprising a recurrent neural network trained to perform question feature extraction using a recurrent gated unit, the recurrent neural network configured to receive a question and extract features from the question, the question comprising words each of which being represented by a dimensional embedding vector that is passed through the recurrent gated unit;
    a fusion engine trained to transform respective outputs of the convolutional neural network and the recurrent neural network into a combined feature vector using a fusion algorithm, based on weights assigned to combinations of the extracted input image features and the extracted question features;
    a third neural network comprising a graph neural network trained to perform node aggregation based on a given knowledge graph received as input, the graph neural network configured to:
        receive a knowledge graph, the knowledge graph including nodes and vertices connecting the nodes,
        receive a vector representation of the nodes of the knowledge graph, and
        generate question-guided aggregated representations of the nodes of the knowledge graph that depend on the extracted question features and the vector representation of the nodes of the knowledge graph; and
    a classification engine trained to assign a probability-based classification to one or more nodes of the knowledge graph, the classification engine configured to generate, based on the combined feature vector and the question-guided aggregated representations of the nodes of the knowledge graph, an answer to the question,
        wherein the answer is displayed on a display unit.

2. The system of claim 1, wherein the extracted input image features correspond to different regions of the input image, wherein the extracted question features correspond to different words of the question.

3. The system of claim 1, wherein generating the answer to the question comprises assigning, for one or more nodes of the knowledge graph, a probability that a given one of the one or more nodes represents the answer to the question.

4. The system of claim 1, wherein a web-based application accesses one or more of the first neural network, the second neural network, the fusion engine, the third neural network, and the classification engine, the web-based application configured to receive the input image and the question.

5. The system of claim 4, wherein the first neural network, the second neural network, the fusion engine, the third neural network, and the classification engine comprise a machine learning model.

6. A method, comprising:
receiving, at a first neural network comprising a convolutional neural network trained to perform image feature extraction using a bottom-up attention strategy, an input image, the convolutional neural network of the first neural network configured to extract features from the input image using the bottom-up attention strategy;
receiving, at a second neural network comprising a recurrent neural network trained to perform question feature extraction using a recurrent gated unit, a question, the recurrent neural network of the second neural network configured to extract features from the question, the question comprising words each of which being represented by a dimensional embedding vector that is passed through the recurrent gate unit;
generating, by a fusion engine trained to transform respective outputs of the convolutional neural network and the recurrent neural network into a combined feature vector using a fusion algorithm, the combined feature vector based on weights assigned to combinations of the extracted input image features and the extracted question features;
receiving, at a third neural network comprising a graph neural network trained to perform node aggregation based on a given knowledge graph received as input:
    a knowledge graph, the knowledge graph including nodes and vertices connecting the nodes, and
    a vector representation of the nodes of the knowledge graph,
generating, by the graph neural network of the third neural network, question-guided aggregated representations of the nodes of the knowledge graph that depend on the extracted question features and the vector representation of the nodes of the knowledge graph; and
generating, by a classification engine trained to assign a probability-based classification to one or more nodes of the knowledge graph and based on the combined feature vector and the question-guided aggregated representations of the nodes of the knowledge graph, an answer to the question,
    wherein the answer is displayed on a display unit.

7. The method of claim 6, wherein the extracted input image features correspond to different regions of the input image, wherein the extracted question features correspond to different words of the question.

8. The method of claim 6, wherein generating the answer to the question comprises assigning, for one or more nodes of the knowledge graph, a probability that a given one of the one or more nodes represents the answer to the question.

9. The method of claim 6, wherein a web-based application is configured to receive the input image and the question.

10. A non-transitory computer-readable storage medium including program code, which when executed by at least one data processor, causes operations comprising:

receiving, at a first neural network comprising a convolutional neural network trained to perform image feature extraction using a bottom-up attention strategy, an input image, the convolutional neural network of the first neural network configured to extract features from the input image using the bottom-up attention strategy;

receiving, at a second neural network comprising a recurrent neural network trained to perform question feature extraction using a recurrent gated unit, a question, the recurrent neural network of the second neural network configured to extract features from the question the question comprising words each of which being represented by a dimensional embedding vector that is passed through the recurrent gated unit;

generating, by a fusion engine trained to transform respective outputs of the convolutional neural network and the recurrent neural network into a combined feature vector using a fusion algorithm, the combined feature vector based on weights assigned to combinations of the extracted input image features and the extracted question features;

receiving, at a third neural network comprising a graph neural network trained to perform node aggregation based on a given knowledge graph received as input:

a knowledge graph, the knowledge graph including nodes and vertices connecting the nodes, and a vector representation of the nodes of the knowledge graph, generating, by the graph neural network of the third neural network, question-guided aggregated representations of the nodes of the knowledge graph that depend on the extracted question features and the vector representation of the nodes of the knowledge graph; and generating, by a classification engine trained to assign a probability-based classification to one or more nodes of the knowledge graph and based on the combined feature vector and the question-guided aggregated representations of the nodes of the knowledge graph, an answer to the question, wherein the answer is displayed on a display unit.

11. The non-transitory computer-readable storage medium of claim 10, wherein generating the answer to the question comprises assigning, for one or more nodes of the knowledge graph, a probability that a given one of the one or more nodes represents the answer to the question.

* * * * *